Patented Jan. 13, 1953

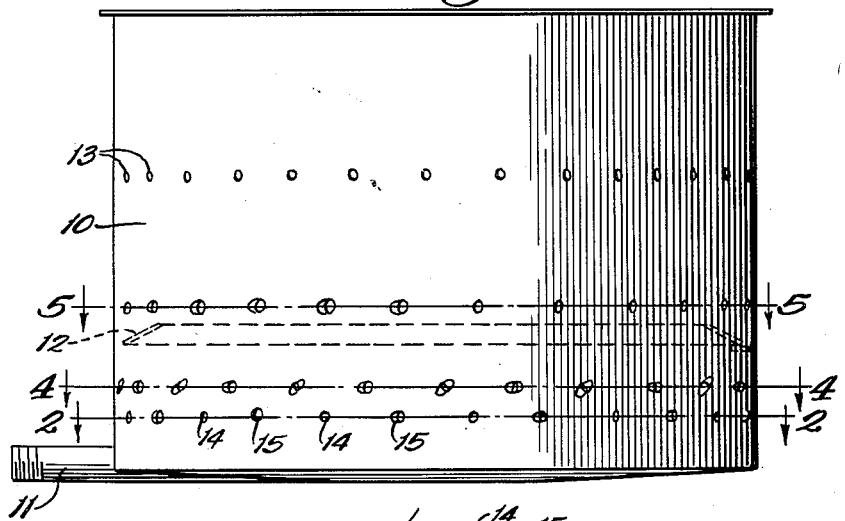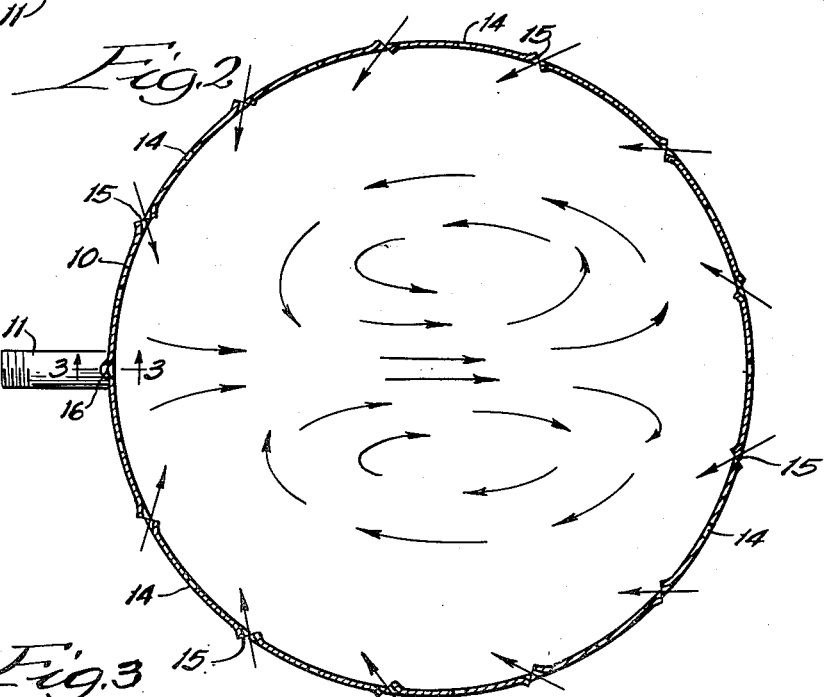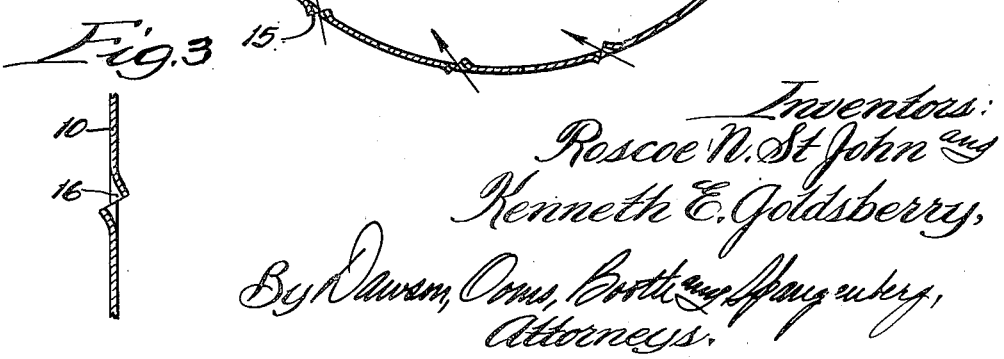

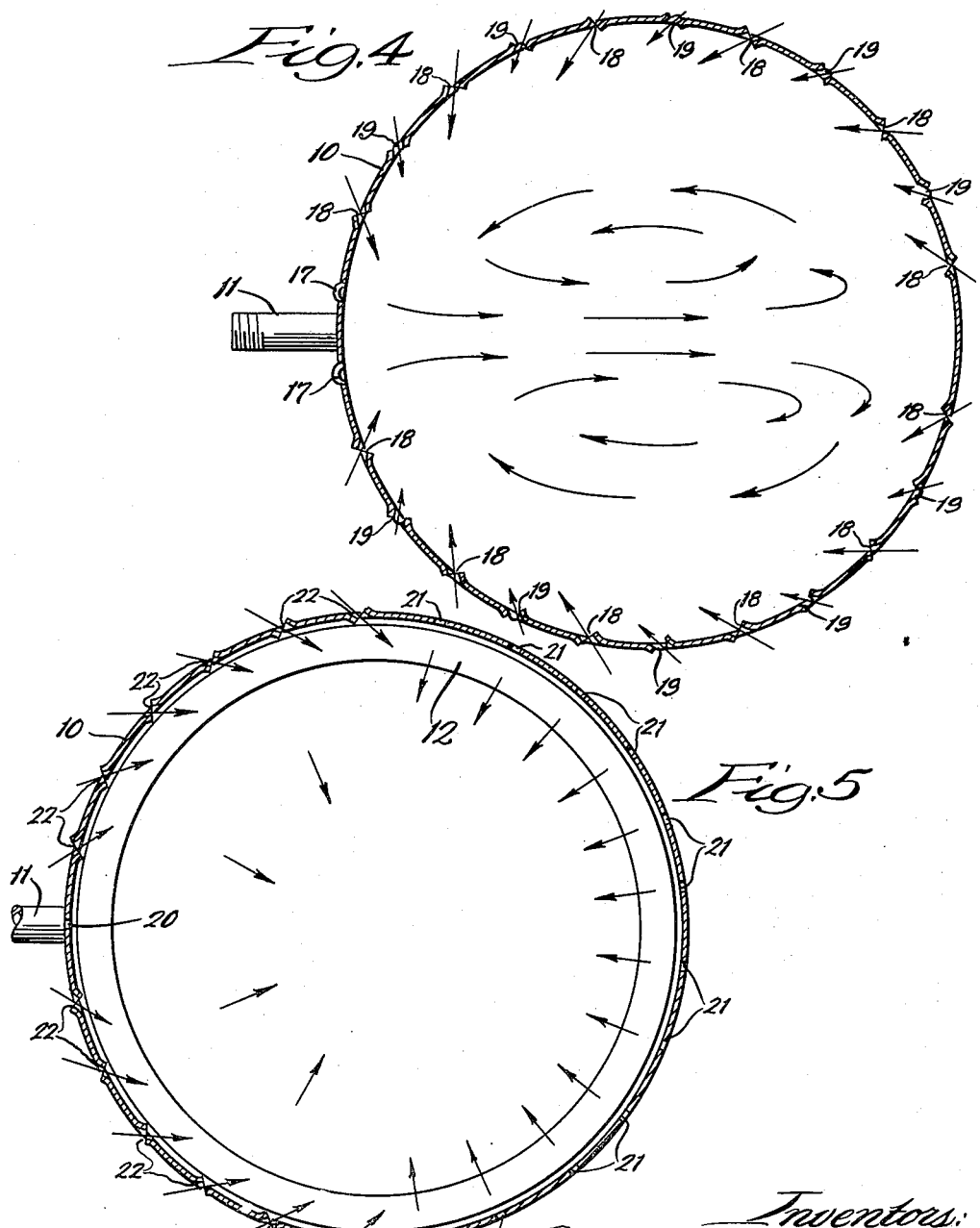

2,625,214

UNITED STATES PATENT OFFICE 2,625,214

POT TYPE OIL BURNER

Roscoe N. St. John and Kenneth E. Goldsberry, Wichita, Kans., assignors to The Coleman Company, Inc., Wichita, Kans., a corporation of Kansas Application May 22, 1948, Serial No. 28,693

2 Claims. (Cl. 158—91)

This invention relates to a pot type burner and, more particularly, to a pot type burner equipped with specially arranged burner ports in the lower part of the burner.

An object of the invention is to provide a pot type burner equipped with means for producing a better air and oil vapor mixture in the lower portion of the pot burner. Yet another object is to provide a pot burner casing with tipped burner ports which bring about a better mixing of oil vapors and oil in the lower portion of the burner to favor blue flame combustion at low, intermediate and high fire oil rates. A still further object is to provide a pot burner casing equipped with tipped burner ports which introduce air in a plurality of separate sheets at differrent levels in the pot, while also providing at an upper level means for equalizing the distribution of the fuel gases. Yet another object is to provide a structure for rotating the introduced air in conjunction with oil-rich vapors from the oil inlet to produce a double spiral or annulus within the casing for better admixture of the air and vapors, while at the same time providing means at a higher level for counteracting such rotation and equalizing the distribution of the fuel gases. Other specific objects and advantages will appear as the specification proceeds.

The invention is illustrated, in a single embodiment, by the accompanying drawings, in which—

Figure 1 is a side view in elevation of a burner pot casing embodying our invention; Fig. 2, a transverse sectional view, the section being taken as indicated at line 2 of Fig. 1; Fig. 3, a detail sectional view on an enlarged scale, the section being taken as indicated at line 3 of Fig 2; Fig. 4, a transverse sectional view, the section being taken as indicated at line 4 of Fig. 1; and Fig. 5, a transverse sectional view, the section being taken as indicated at line 5 of Fig. 1.

In the illustration given, 10 designates a pot burner casing. The burner is equipped, near its bottom, with an oil inlet pipe 11. The pot burner casing may be of any suitable form or construction. The invention herein is applicable to pot burner casings of many different forms, and the particular form set out herein is merely for the purpose of illustration. If desired, the pot burner may be equipped with a pilot ring 12 and an upper row of air ports 13. The portion of the burner above the ring may be provided with any desired number of rows of air ports.

The present invention has to do with the placing of air ports and, preferably, spaced rows of air ports in the lower portion of the burner. Should a pilot ring be employed, it is preferred that certain rows of openings be below the pilot ring, as illustrated in Fig. 1.

In the arrnagement of the air ports, we prefer to have some of them tipped so as to direct air downwardly toward the bottom of the pot, while others are directly laterally. Some of the ports may be directed both laterally and downwardly and other ports may be straight or untipped in direction. We prefer that the lateral tipping of the ports be such as to produce an annulus or annuli of the air and oil vapors within the casing, so that oil-rich vapors will be picked up near the point of the oil inlet and carried rapidly into a rotating air and vapor mixture. Excellent results have been obtained by so tipping the ports as to produce two spirals or annuli, as illustrated in Fig. 2. At a higher level, we prefer to introduce air ports which are tipped in an opposite lateral direction to overcome such rotation and to bring about an equalization of the distribution of the fuel gases.

An additional factor, in the arrangment of the air ports in the lower portion of the burner casing, is the arrangement whereby the introduced air forms a number of separate sheets at a number of different levels. For example, the ports in a single row may be arranged so that some are tipped and others are held in a different plane, so that the resulting air streams form air sheets which are separate and are at different levels.

In the practice of our invention, we prefer to arrange the ports in rows which are spaced apart and as illustrated in the drawings. It will be understood, however, that the above new results may be obtained without the use of rows and by spacing the ports separately and in different arrangements throughout the lower portion of the burner casing.

In the specific illustration given, the lowermost row of openings, as shown best in Fig. 2, comprises the ports 14, which are untipped and which lead in a straight horizontal plane into the burner casing, and also the tipped burner ports 15. The tipped burner ports 15 are tipped in a horizontal plane about 45° toward the oil inlet pipe 11. It will be observed that the ports 15 diverge in their direction on either side of a diametric line drawn through the inlet pipe 11. In other words, the ports 15 adjacent to and on opposite sides of the inlet pipe 11, actually are directed toward each other, although at the same time they are directed toward the inlet pipe.

Two distinct sheets of air are formed and at two separate levels. The ports 14 direct air inwardly in a straight horizontal plane. The ports 15 direct air inwardly at a lower level. In the sheet metal casing 10 illustrated, we find that effective tipping of the air ports may be accomplished manually after the metal has been provided with a straight opening, such as is illustrated by the opening 14, by introducing a metal pin or bar through the opening and then turning the bar in the direction represented by the arrow. To turn the port laterally in a horizontal direction, it is merely necessary to swing the bar to the position illustrated by the arrow in Fig. 2. If the port is to be tipped downwardly 45°, as well as laterally 45°, the outer end of the bar is swung upwardly so that the lower end tilts downwardly at an angle of 45°. The burner port 16, which is arranged above the inlet pipe 11, is preferably not directed laterally, but is merely tipped downwardly at an angle of 45°, as illustrated best in Fig. 3.

In the second row of openings from the bottom, as illustrated best in Fig. 4, we provide two openings 17 on either side of the inlet pipe 11, which openings are similar to opening 16 of Fig. 3 and are tipped downwardly at an angle of 45°.

The ports indicated by the numeral 18 are tipped about 45° toward the oil inlet pipe 11 and in a horizontal plane. The ports 19 are tipped also 45° toward the oil inlet pipe 11 but also in a downward direction about 15° below the horizontal plane.

In the third row of ports from the bottom, as shown best in Fig. 5, the port 20 above the oil inlet is preferably straight and in a horizontal line, and the ports 21 are also preferably straight and in a horizontal line. The tipped ports, as indicated by the numeral 22, are tipped in a direction away from the oil inlet pipe 11 for about 45° and in a horizontal plane. It will be observed that the tipping of the ports 22 in the third row from the bottom is opposite to the direction of tipping of the ports 18 in the second row.

The intent of this construction is to provide a burner which will be suitable for burning fuel oils known to the trade as cracked oils. Such oils are composed of a wide variety of hydrocarbon compounds including certain compounds known as aromatics, at least some of which are related in molecular structure to benzine. It is a well known fact that fuel oils containing high percentages of aromatic compounds and various other hydrocarbon compounds not of the paraffinic type require for their clean and satisfactory combustion a rather special type of preparation within a burner for the actual combustion processes. Among these generally understood requirements is the need for a more thorough mixing of air with the fuel vapors at the earliest possible instant after vaporization occurs, together with the maintenance of correct burner temperatures during such mixing process.

Better mixing in a pot type burner may be obtained as the result of—

1. An increase in the number of air jets used to introduce air into the burner.

2. A maximum of air movement within the burner resulting from the utilization of the energy of the jets to produce movement of the fuel air mixture.

3. Effective distribution of the air ports and effective direction of the resulting air jets so that air will be distributed as generally as possible, particularly in the lower portion of a vaporizing pot type burner so that the rising fuel vapors must not only pass through or across a large number of air jets but also must undergo frequent change of direction during such process as a result of turbulent air flow in the passing jets.

When insufficient mixing of the air with fuel vapors is present in the lower part of the burner there is a decided tendency for red smoky flames to result at all firing rates whereas if the mixing is very thoroughly carried out under proper conditions the low and intermediate firing rates show blue or violet colored flames and at high fire the flame is a bright or full orange without the dark red with streaks of soot which would otherwise occur.

*Operation*

In the operation of the apparatus, the oil flows through the inlet pipe 11 into the lower portion of the burner. The downwardly-tipped ports 16, 17 and 19 bring air against the bottom portion of the burner to pick up the oil vapors, and the lateral direction of the introduced air causes the air to move in the form of the two annuli illustrated in Fig. 1. In this operation, the downwardly-directed air streams pick up the oil-rich vapors from the incoming oil and near the inlet, and carry these rapidly across the casing into the ascending spirals. The spirals bring about an effective mixing of such vapors with the air entering from all sides of the casing. Upon the lighting of the fire, it is found that a blue flame combustion results, both at low and intermediate oil rates; and at high fire oil rates, a brighter, cleaner flame results from this type of construction. The lower two rows of ports distribute the inlet air in four distinct and separate sheets or at four different levels, and the tipping of the ports to bring about the rotation described, results in a thorough mixing of the oil-rich vapors with the incoming air at these levels.

The third row of ports, just above the pilot ring 12, utilizes the oppositely-tipped ports 22 to stop or retard the rotation of the flame as it moves upwardly through the annular opening in the pilot ring, while equalizing the distribution of the fuel gases. By the use of the tipped ports, the flow of gases is straightened and uniform distribution is brought about throughout the upper part of the pot, and the air introduced through the straight ports 21 is distributed through a relatively non-rotating body.

As a result of the rotation of air and vapors in the extreme lower portion of the pot for admixture of vapor and air, and as a result of the straightening out of the flow of gases and their uniform distribution through the upper part of the pot, we find that blue flame combustion occurs at the several stages, namely, at low and intermediate oil rates while at high fire oil rates the combustion is improved and a brighter cleaner flame results.

While, in the foregoing specification, we have set forth a single structure in considerable detail for the purpose of illustrating one embodiment of the invention, it will be understood that such details of structure may be varied widely by those skilled in the art without departing from the spirit of our invention.

We claim:

1. In a pot type burner, a pot casing providing a side wall and a substantially flat bottom wall and equipped at its bottom with an oil inlet pipe, said side wall being provided with air ports tipped downwardly to discharge air streams toward the bottom of the pot and with air ports therebelow tipped laterally to spread said downwardly-directed streams over the bottom of said pot, the second-mentioned ports in one half of the pot on one side of said inlet pipe being spaced apart throughout said half of the pot and being tipped laterally, and said second-mentioned ports in the other half of said pot being spaced apart throughout said half of the pot and being tipped laterally in an opposite direction, whereby air in the lower portion of the pot is caused to rotate in two annuli with the adjacent sides of the annuli traversing the center of the pot.

2. In a pot type burner, a pot casing providing a side wall and a bottom wall and equipped at its bottom with an oil inlet pipe, said side wall being provided with an upper row of air ports which are tipped downwardly to discharge air streams toward the bottom of the pot, said side wall being provided with a lower row of air ports which are tipped laterally to spread said downwardly directed streams over the bottom of said pot, said ports in the lower row and in one-half of the pot on one side of said inlet pipe being spaced apart throughout said half of the pot and being tipped laterally, and the said ports in the lower row and in the other half of said pot being spaced apart throughout said half of the pot and being tipped laterally in an opposite direction, whereby air in the lower portion of the pot is caused to rotate in two annuli with the adjacent sides of the annuli traversing the center of the pot.

ROSCOE N. ST. JOHN.
KENNETH E. GOLDSBERRY.

REFERENCES CITED

The following references are of record in the file of this patent:

UNITED STATES PATENTS

| Number | Name | Date |
| --- | --- | --- |
| 1,566,489 | Little | Dec. 22, 1925 |
| 1,782,049 | Powers | Nov. 18, 1930 |
| 2,120,372 | O'Hagan | June 14, 1938 |
| 2,165,212 | Bauer | July 11, 1939 |
| 2,225,467 | Breese | Dec. 17, 1940 |
| 2,286,489 | Jones | June 16, 1942 |
| 2,357,587 | Hammell | Sept. 5, 1944 |
| 2,382,463 | Beyer | Aug. 14, 1945 |
| 2,501,688 | Peeling | Mar. 28, 1950 |

FOREIGN PATENTS

| Number | Country | Date |
| --- | --- | --- |
| 462,414 | Great Britain | Mar. 9, 1937 |